F. H. PAGE.
UNDERCARRIAGE FOR AIRCRAFT.
APPLICATION FILED MAY 12, 1919.

1,332,567.

Patented Mar. 2, 1920.
3 SHEETS—SHEET 1.

Frederick Handley Page

F. H. PAGE.
UNDERCARRIAGE FOR AIRCRAFT.
APPLICATION FILED MAY 12, 1919.
1,332,567.
Patented Mar. 2, 1920.
3 SHEETS—SHEET 2.
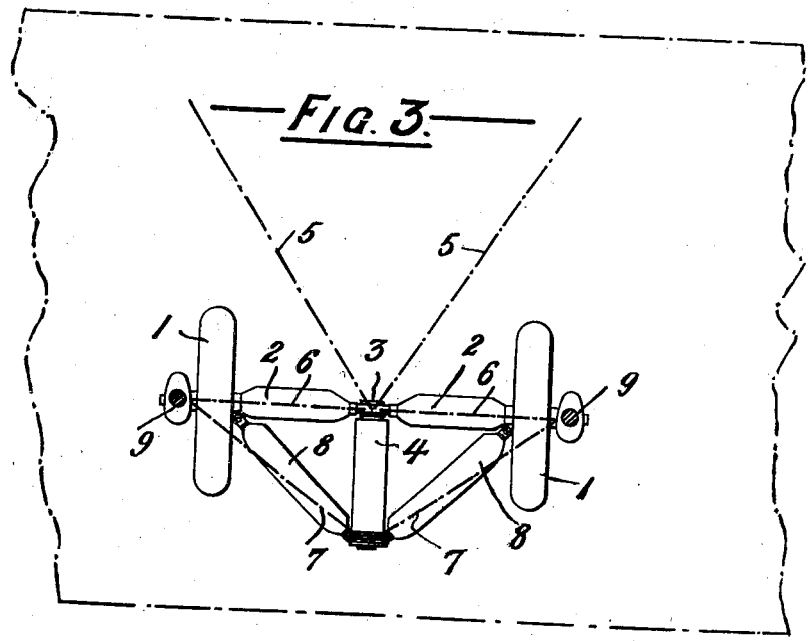
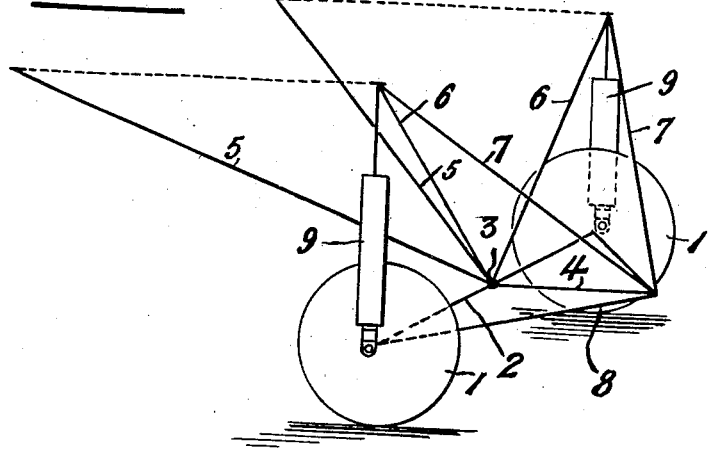

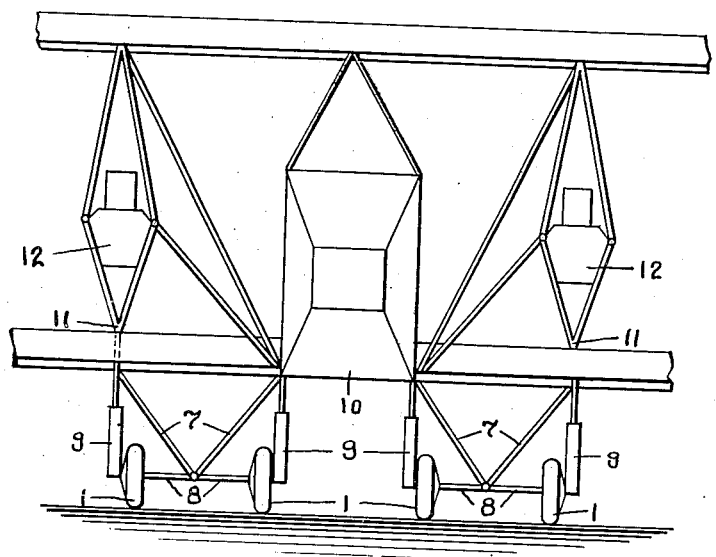

UNITED STATES PATENT OFFICE.

FREDERICK HANDLEY PAGE, OF LONDON, ENGLAND, ASSIGNOR TO HANDLEY PAGE LIMITED, OF LONDON, ENGLAND.

UNDERCARRIAGE FOR AIRCRAFT.

1,332,567.　　　　Specification of Letters Patent.　　Patented Mar. 2, 1920.

Application filed May 12, 1919. Serial No. 296,612.

*To all whom it may concern:*

Be it known that I, FREDERICK HANDLEY PAGE, a subject of the King of Great Britain, residing at London, England, have invented certain new and useful Improvements in Undercarriages for Aircraft, of which the following is a specification.

This invention relates to improved landing gear for aircraft, the invention resting in the connections between the aircraft and the wheels or other supporting means, hereinafter termed wheels, and being contrived to effect the connection so that each wheel may rise and fall elastically and with complete freedom independently of the other wheel or wheels.

According to this invention the wheels are each carried on journals at the ends of a centrally jointed axle, the pivot of which is rigidly connected to the underside of the aircraft to be supported. Further rigid connections attached to the aircraft rigidly support the outer end of a horizontal member carrying this pivot at one of its ends and projecting at right angles from the hinged joint at the junction of the divided axle.

The outer ends of the divided axle, immediately inside the journals thereof are connected by links to the projecting end of the horizontal member to which latter they are hinged in such a manner that the links and the halves of the divided axle form triangular frames carrying at their apices the journals which support the wheels.

The wheels are thus carried on hinged triangular frames capable of movement about the horizontal member, and the complete freedom of this movement is restrained and controlled by springs or shock absorbers situated between the exterior free ends of the axle outside the journal and the under portion of the aircraft.

The above description of under carriage is especially suitable for use in pairs on multi-engined aircraft the construction lending itself most suitably to the employment of two such under carriages, the inner connecting rods and supports being attached to the aircraft below the central fuselage and the outer supports being situated respectively below the port and starboard engines.

Figure 1:
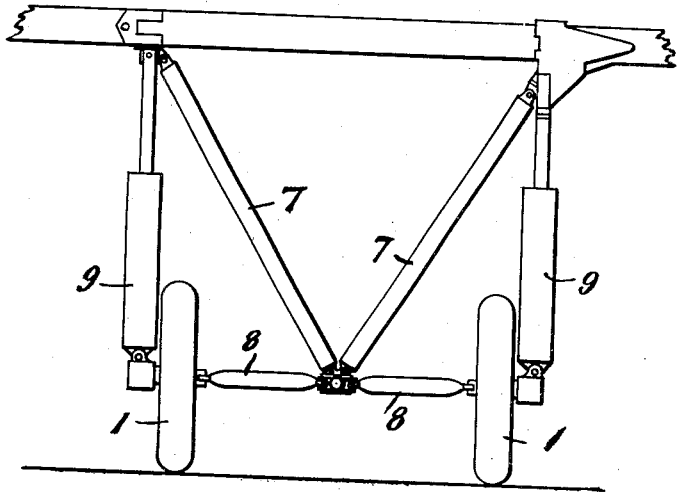
Figure 2:
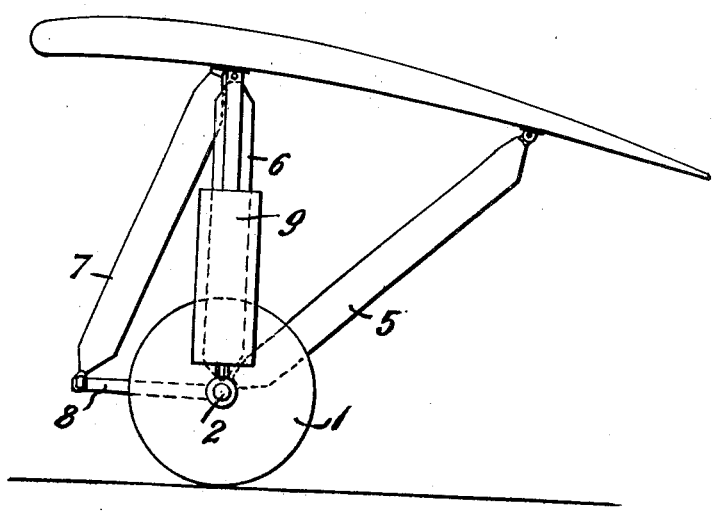

The invention is more particularly described with reference to the accompanying drawings in which Figure 1 is a front elevation and Fig. 2 a side elevation of so much of an under carriage as is necessary to illustrate the invention. Fig. 3 is a diagrammatic plan view of the same under carriage, Fig. 4 a diagrammatic perspective view of the same arrangement and Fig. 5 is a front view of a double-engined aeroplane supported by two undercarriages.

The wheels 1 of the landing gear are carried at the outer ends of an axle 2, divided centrally and hinged at the point 3 to one end of a forwardly projecting horizontal member 4. The end 3 of this horizontal member is rigidly connected to the under side of the aircraft by upwardly projecting struts 5, 5, 6, 6, and the forward end of this member 4 is rigidly connected with the aircraft by struts 7.

The divided axle 2 at points near its outer ends and within the wheels 1 is connected to the horizontal member 4 by angularly disposed horizontal struts 8.

The outer ends of the divided axle 2 outside the wheels are connected to the under side of the aircraft by vertically disposed shock absorbing members 9. In Fig. 5 the application of two undercarriages to an aeroplane with two engines is illustrated, the engines 12 in their supporting frames 11 being supported by the outer wheels 1 of each undercarriage while the inner wheels of the two undercarriages support opposite sides respectively of the fuselage 10.

From the foregoing description it will be seen that the struts 5, 6 and 7 hold the horizontal member 4 in rigid connection with the under portion of the aircraft while the wheels 1, divided axle 2 and struts 8 are capable of angular movement with respect to the horizontal member 6, such movement being restrained by the shock absorbers 9 thus allowing a yielding independent movement of each wheel 1 with respect to the aircraft.

What I claim as my invention and desire to secure by Letters Patent is:—

1. A landing chassis for an aircraft, comprising a longitudinal strut carried by the aircraft and ground contacting means arranged symmetrically on each side of said strut, pivoted braces connecting the inner sides of said ground contacting means to said strut and elastic means connecting the outer sides of said ground contacting means to the engine cradle and fuselage respectively.

2. In an aircraft having a fuselage and port and starboard engines, two landing gears, each of said landing gears comprising a longitudinal strut, wheels journaled on the ends of pivoted stub axles and arranged symmetrically on each side of said strut, pivoted braces connecting the inner side of said wheel journals to said strut and compression elements pivotally connecting the outer ends of said journals to particular parts of the aircraft, the outer wheels being connected directly to said port and starboard engines respectively while the inner wheels support the fuselage, substantially as specified.

In witness whereof I have hereunto set my hand in the presence of two witnesses.

FREDERICK HANDLEY PAGE.

Witnesses:
 GRIFFITH BREWER,
 CYRIL GRIFFITH BREWER.